May 25, 1965    Z. A. CAOUETTE ETAL    3,184,917
REENFORCED SEAL FOR ROCKET NOZZLE
Filed May 15, 1961

INVENTORS
ZEPHIRIN A. CAOUETTE
DAVID L. FITTON

BY Charles Q. Warren

ATTORNEY

United States Patent Office 3,184,917
Patented May 25, 1965

3,184,917
REENFORCED SEAL FOR ROCKET NOZZLE
Zephirin A. Caouette, Vernon, and David L. Fitton, Hazardville, Conn., assignors to United Aircraft Corporation, East Hartford, Conn., a corporation of Delaware
Filed May 15, 1961, Ser. No. 110,060
3 Claims. (Cl. 60—35.55)

This invention relates to a seal device to prevent leakage between the relatively fixed and movable portions of a rocket nozzle.

One feature of the invention is a re-enforced flexible seal extending between the two nozzle portions and having individual re-enforcing elements mounted thereon. Another feature is a flexible seal having convolutions therein with re-enforcement of the individual corrugations by which to hold the seal in position.

One particular feature is a re-enforced seal extending between the two portions of the nozzle and surrounding the clearance space between the portions thereby to prevent leakage of propellant through this clearance space in which the structure is designed to have the thrust loading carried by gimbals so that the seal carries only pressure loading.

Other features and advantages will be apparent from the specification and claims, and from the accompanying drawing which illustrates an embodiment of the invention.

Figure 1:
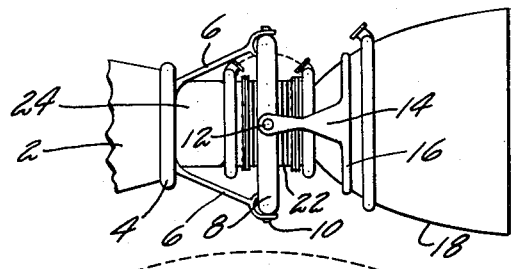
Figure 2:
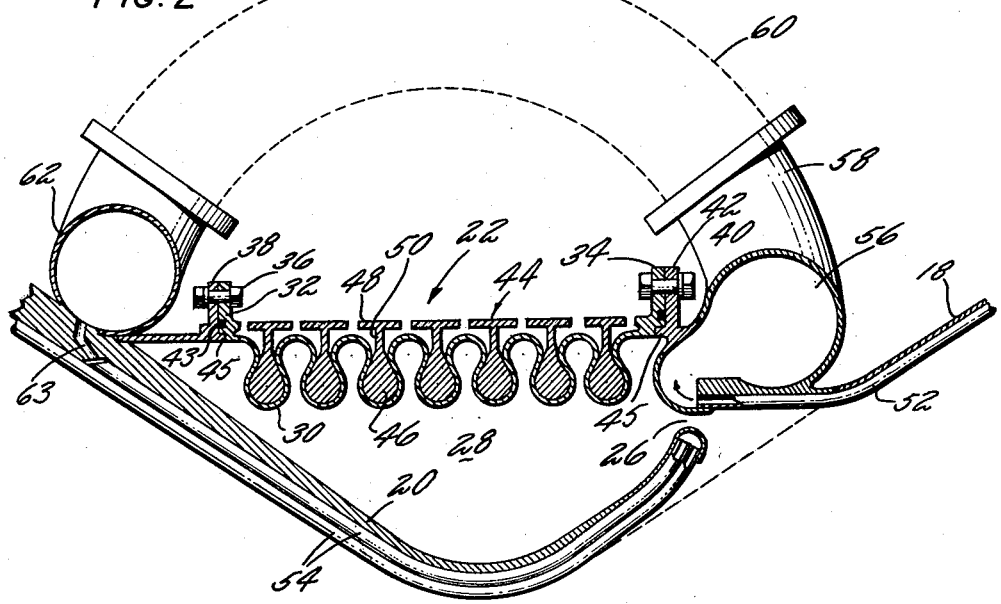

FIG. 1 is a side elevation of the device.
FIG. 2 is a fragmentary sectional view on a much larger scale showing the arrangement of the seal.

The invention is shown in a rocket construction which is adapted to be mounted on a vehicle 2 by a mounting ring 4. The mounting ring 4 has opposed arms 6 by which the gimbal ring 8 is mounted for pivotal movement on the axis of support pins 10. At right angles to the pins 10 the ring 8 carries other pivot pins 12 engaged by arms 14 on a ring 16 attached to the divergent or discharge portion 18 of the nozzle. This arrangement provides a gimballing of the divergent portion of the nozzle with respect to the throat portion 20, FIG. 2, which is surrounded by the seal 22. The throat portion 20 communicates with the combustion chamber 24 for the rocket.

The effect of the gimbal is to permit vectoring of the divergent portion 18 of the nozzle with respect to the throat portion 20, the movement required being only a few degrees of motion of the portion 18. To permit this relative movement, the forward end of the divergent portion 18 surrounds and is out of contact with the downstream end of the throat portion to define a clearance space 26 which will permit the relative movement for vectoring without placing the portions 18 and 20 in contact. The gimbal structure which provides for this vectoring movement carries the mechanical loading on the parts of the device. Leakage is prevented through the clearance space 26, which is preferably positioned downstream of the nozzle throat to permit some exhaust gas expansion, by the seal 22 which surrounds the throat of the nozzle to form a pressure chamber 28 around the throat of the nozzle, the seal being connected at upper and lower ends respectively to the throat portion 20 and to the divergent portion 18.

The seal 22 is in the form of a convoluted element 30 having the convolutions arranged in annular form. The element 30 has an attachment flange 32 at the upstream end of the convolutions and a similar attachment flange 34 at the downstream end. The attachment flange 32 is attached as by bolts 36 to a cooperating flange 38 attached to the throat portion of the nozzle. The flange 34 is attached as by bolts 40 to a flange 42 on the divergent portion of the nozzle. The attachment flanges 32 and 34 are preferably grooved to receive seal rings 43, and each attachment flange is piloted by a projecting rib 45 on the associated flanges 38 and 42.

The corrugated or convoluted member 30 is re-enforced by support rings 44 with one for each convolution. Each support ring has a ring portion 46 fitting within the associated convolution and substantially filling the convolution. Each support ring 44 also includes a cylindrical portion 48 positioned outside of the convoluted ring and connected to the associated ring portion 46 by an integral disc portion 50. The disc is made of such a dimension that the cylindrical portion 48 will be out of contact with the convoluted element 30 and the dimensions of the several cylindrical portions 48 is such that adjacent cylindrical elements will not be in endwise contact. When the divergent portion 18 is moved the cylindrical elements 48 prevent excessive bending of any individual convolution by coming in contact with one another before excess bending occurs. Bending is then distributed more or less equally among the several convolutions. With an arrangement of this type, the convoluted member will withstand the pressure within the chamber 28 which obviously will be the same as that within the nozzle adjacent the clearance space 26. Further, once the pressure is built up in the chamber 28, the seal 22 effectively prevents any leakage therefrom and accordingly, prevents leakage through the space 26. The seal 22 provides an adequate flexible connection between the portions 18 and 20 so that the vectoring provided by the gimbal may be obtained without interfering with the functioning of the seal.

In the arrangement shown, both the divergent portion 18 and the throat portion are cooled by coolant passages 52 in the divergent portion and passages 54 in the throat portion. It is desirable to have the flow of coolant first through one of these sets of coolant passages and then through the other. To accomplish this the passages 52 in the divergent portion 18 all discharge into a collector ring 56 surrounding the divergent portion and having a connecting duct 58 thereon. From this duct coolant flows through a flexible conduit 60 externally of the seal element 22 into a similar collector ring 62 positioned externally on the throat portion 20 and communicating through ducts 63 with the passages 54 in the throat portion. In this way flow of coolant may be first through the portion 18 and then through the throat portion 20.

It is to be understood that the invention is not limited to the specific embodiment herein illustrated and described, but may be used in other ways without departure from its spirit as defined by the following claims.

We claim:
1. A rocket nozzle having a fixed annular throat portion defining a nozzle throat portion and a moveable annular divergent discharge portion downstream thereof and through which rocket exhaust gases are discharged to atmosphere, gimbal means connecting said portions and providing for vectoring movement of the discharge portion, said portions being radially spaced apart downstream of said throat to provide for the vectoring movement, in combination with sealing means extending between said portions externally of the radial spacing and substantially at said throat to define a chamber with said portions which chamber communicates with the rocket nozzle interior through said radial spacing to receive exhaust gases and become pressurized thereby, the pressure in said chamber acting against said moveable discharge portion to balance the thrust of exhaust gases acting against the interior thereof, said seal including a convoluted ring having end attachment devices thereon, each of said portions having attachment means in spaced rela- tion for engagement with the attachment devices, and support rings surrounding and engaging with the convoluted ring for re-enforcement of said ring.

2. A rocket nozzle having an annular throat portion defining a nozzle throat and an annular discharge portion, gimbal means connecting said portions and providing for vectoring movement of the discharge portion, said portions being radially spaced apart to provide for the vectoring movement, in combination with sealing means extending between said portions externally of the radial spacing and substantially at said throat to prevent leakage through said radial spacing, said seal including a convoluted ring having end attachment devices thereon, each of said portions having attachment means in spaced relation for engagement with the attachment devices, and support rings surrounding and engaging with the convoluted ring for re-enforcement of said ring, in which each nozzle portion has cooling passages therein and in which a flexible duct externally of the seal forms a connection from the cooling passages of one portion to the cooling passages of the other portion.

3. A rocket nozzle having an annular throat portion defining a fixed nozzle throat portion and a moveable annular divergent discharge portion downstream thereof and through which rocket exhaust gases are discharged to atmosphere, gimbal means connecting said portions and providing for vectoring movement of the discharge portion, said portions being radially spaced apart downstream of said throat to provide for the vectoring movement, in combination with sealing means extending between said portions externally of the radial spacing and substantially at said throat to define a chamber with said portions which chamber communicates with the rocket nozzle interior through said radial spacing to receive exhaust gases and become pressurized thereby, the pressure in said chamber acting against said moveable discharge portion to balance the thrust of exhaust gases acting against the interior thereof, said seal including a convoluted ring having end attachment devices thereon, each of said portions having attachment means in spaced relation for engagement with the attachment devices.

References Cited by the Examiner
UNITED STATES PATENTS

| | | | |
|---|---|---|---|
| 2,707,117 | 4/55 | Fentress et al. | 285—226 |
| 2,713,503 | 7/55 | Ekholm | 285—226 X |
| 2,721,746 | 10/55 | Schindler | 285—228 |
| 2,780,059 | 2/57 | Fiedler | 60—35.55 |
| 2,904,356 | 9/59 | Love | 285—226 |
| 2,933,891 | 4/60 | Britt | 285—226 |
| 2,936,185 | 5/60 | Olsen et al. | 285—226 |
| 2,977,754 | 4/61 | Bell. | |
| 3,032,982 | 5/62 | Gaubatz | 60—35.55 |
| 3,046,736 | 7/62 | Thomson | 60—35.55 |
| 3,069,853 | 12/62 | Eder | 60—35.55 |

FOREIGN PATENTS 722,338   1/55   Great Britain.

OTHER REFERENCES

American Aviation Publication, "Complication for Solids: Thrust-Direction Control," by Norman L. Baker, appearing in Missiles and Rockets, February 9, 1959, page 24 relied on.

SAMUEL LEVINE, *Primary Examiner.*

JULIUS E. WEST, ABRAM BLUM, *Examiners.*